(12) United States Patent
Kang et al.

(10) Patent No.: US 12,468,908 B2
(45) Date of Patent: Nov. 11, 2025

(54) SAFETY INSPECTION SOLUTION FOR EXPLOSION PROOF DIAGNOSIS

(71) Applicant: FOEX CO., LTD., Ulsan (KR)

(72) Inventors: Gyu Hong Kang, Changwon-si (KR); Sun Kwon Lee, Changwon-si (KR)

(73) Assignee: FOEX CO., LTD., Ulsan (KR)

( * ) Notice: Subject to any disclaimer, the term of this patent is extended or adjusted under 35 U.S.C. 154(b) by 0 days.

(21) Appl. No.: 18/837,032

(22) PCT Filed: Jul. 11, 2023

(86) PCT No.: PCT/KR2023/009806
§ 371 (c)(1),
(2) Date: Aug. 8, 2024

(87) PCT Pub. No.: WO2024/071608
PCT Pub. Date: Apr. 4, 2024

(65) Prior Publication Data
US 2025/0148231 A1 May 8, 2025

(30) Foreign Application Priority Data
Sep. 26, 2022 (KR) .................... 10-2022-0121437

(51) Int. Cl.
*G06K 7/10* (2006.01)
(52) U.S. Cl.
CPC .................. *G06K 7/10366* (2013.01)
(58) Field of Classification Search
CPC .............................................. G06K 7/10366
USPC ........................................................ 235/451
See application file for complete search history.

(56) References Cited

U.S. PATENT DOCUMENTS

| | | | | |
|---|---|---|---|---|
| 11,852,363 B1* | 12/2023 | Havelick | .................. | F24F 11/32 |
| 2013/0078909 A1* | 3/2013 | Smith | ................. | H04M 1/0264 |
| | | | | 455/7 |
| 2021/0265688 A1* | 8/2021 | Onishi | .................... | H04N 23/57 |

FOREIGN PATENT DOCUMENTS

| | | |
|---|---|---|
| JP | 2006-260438 A | 9/2006 |
| KR | 10-2002-0083036 A | 11/2002 |
| KR | 10-0949428 B1 | 3/2010 |
| KR | 10-2015-0076908 A | 7/2015 |
| KR | 10-2016-0001580 A | 1/2016 |

(Continued)

*Primary Examiner* — Ahshik Kim
(74) *Attorney, Agent, or Firm* — Birch, Stewart, Kolasch & Birch, LLP (57) ABSTRACT

A safety inspection solution for an explosion-proof diagnosis generates an identification code of a demand target after receiving the demand target information and enables the supply target terminal to generate and manage the demand target information, wherein the demand target information includes equipment information received from an equipment inspection unit, an amount of gas measured from a gas inspection unit, an amount of dust measured from a dust measurement unit, a temperature measured from a temperature measurement unit, an access authority status of the demand target inspected from an access authority unit, and an estimated explosion location measured from a location specifying unit, and wherein the supply target terminal collects the received equipment information, the amount of gas, the amount of dust, the temperature, the access authority status of the demand target, and the estimated explosion location to provide the same to the demand target.

12 Claims, 4 Drawing Sheets

(56) References Cited

FOREIGN PATENT DOCUMENTS

| | | |
|---|---|---|
| KR | 10-2017-0006378 A | 1/2017 |
| KR | 10-2017-0050625 A | 5/2017 |
| KR | 10-2017-0107121 A | 9/2017 |
| KR | 10-2020-0043306 A | 4/2020 |
| KR | 10-2020-0072972 A | 6/2020 |
| KR | 10-2020-0113395 A | 10/2020 |
| KR | 10-2021-0047444 A | 4/2021 |
| KR | 10-2022-0025688 A | 3/2022 |
| KR | 10-2022-0076374 A | 6/2022 |
| KR | 10-2498106 B1 | 2/2023 |
| KR | 10-2517384 B1 | 4/2023 |

* cited by examiner

| Lot size | ALARP ASL (%) |
|---|---|
| ≤50 | Not determinable-assume 4 |
| 51-90 | 4 |
| 91-150 | 4 |
| 151-280 | 2.5 |
| 280-500 | 1.5 |
| 501-1,200 | 1 |
| 1,201-3,200 | 0.65 |

FIG. 5

SAFETY INSPECTION SOLUTION FOR EXPLOSION PROOF DIAGNOSIS

CROSS REFERENCE TO RELATED APPLICATIONS

This application is the National Phase of PCT/KR2023/009806 filed on Jul. 11, 2023, which claims priority under 35 U.S.C. § 119 (a) to Patent Application No. 10-2022-0121437 filed in the Republic of Korea on Sep. 26, 2022, all of which are hereby expressly incorporated by reference into the present application.

TECHNICAL FIELD

The present disclosure relates to a safety inspection solution for explosion-proof diagnosis.

More specifically, the present disclosure is to prevent explosion accidents in high-risk facilities such as power generation facilities, gas, petrochemical, offshore plants, and the like that are always exposed to explosion hazards, and relates to a safety inspection solution for an explosion-proof diagnosis that prevents an occurrence of safety accidents in advance while preventing false information, accidental omissions and misjudgments by mistake, and furthermore enabling updating to be performed quickly when setting up explosion hazard areas and changing facilities, by systemizing and building information on explosion hazard factors.

BACKGROUND ART

In general, nuclear power, gas, petrochemical, marine plants, etc. are industries that provide facilities or build factories to produce products such as electricity, gas, petrochemicals, etc., that is, provide devices, factory facilities, or production facilities that supply raw materials or energy and make physical or chemical reactions to obtain energy and plant facilities are mostly classified as high-risk facilities because many important facilities are complicatedly crowded together in a large space.

Furthermore, since many of the plant facilities in Korea were built in the 1960s and 1970s and are outdated, it is an urgent step to make decisions on disposal, repair, and replacement of facilities. Therefore, continuous monitoring and management are required since most of the plant facilities are high-risk facilities that contain high-risk substances, and it is necessary to quickly inspect the location of plant facilities and respond to failures and damages as soon as possible.

In particular, preventive maintenance is to be performed on a regular basis for high-risk facilities such as nuclear power, gas, petrochemical, etc. and a quick response measure is required in case gas and chemicals leak since large-scale fires and explosions may be caused.

A substantial amount measuring equipment that performs a monitoring function within these high-risk facilities constructs a system in such a way that the system is mounted in a separate explosion-proof enclosure since a non-explosion-proof measuring and monitoring system cannot be used when installed close to pipes and facilities enough to affect high-risk facilities in case a fire or explosion due to an electrical defect or external shock in the measuring equipment happens, but competitiveness is weakened and space restrictions occur due to increased installation costs when installed in a separate explosion-proof enclosure.

In addition, it should always be reviewed and information should be updated when certain conditions change, such as a change in a specific location or equipment of a high-risk facility, a change in the amount of gas usage or the like, but it can be a cause of an explosion accident when such a work process is not performed and information is omitted or false information is recorded.

Accordingly, in order to prevent the above problems, a technology is required to collect correct information on high-risk facilities in order to prevent false information or accidental omissions and misjudgments by mistake by providing a safety inspection solution for explosion-proof inspection.

DISCLOSURE

Technical Problem

The present disclosure is devised to meet the above needs, and the task to be solved in the present disclosure is to prevent explosion accidents in high-risk facilities such as power generation facilities, gas, petrochemical, offshore plants, and the like that are always exposed to explosion hazards, and is to provide a safety inspection solution for an explosion-proof diagnosis that prevents an occurrence of safety accidents in advance while preventing false information, accidental omissions and misjudgments by mistake, and furthermore enabling updating to be performed quickly when setting up explosion hazard areas and changing facilities, by systemizing and building information on explosion hazard factors.

Technical Solution

In order to solve the above task, a safety inspection solution for an explosion-proof diagnosis according to the present disclosure generates an identification code of a demand target after receiving the demand target information from a supply target terminal when the demand target information is inputted through a safety inspection solution system connected to the supply target terminal and then enables the supply target terminal to generate and manage the demand target information by assigning the identification code of the demand target to the supply target, wherein the demand target information includes equipment information received from an equipment inspection unit, an amount of gas measured from a gas inspection unit, an amount of dust measured from a dust measurement unit, a temperature measured from a temperature measurement unit, an access authority status of the demand target inspected from an access authority unit, and an estimated explosion location measured from a location specifying unit, and wherein the supply target terminal collects the received equipment information, the amount of gas, the amount of dust, the temperature, the access authority status of the demand target, and the estimated explosion location and then provides the same to the demand target through the safety inspection solution system.

Advantageous Effects

This present disclosure is to prevent explosion accidents in high-risk facilities such as power generation facilities, gas, petrochemical, offshore plants, and the like that are always exposed to explosion hazards, and has a remarkable effect of preventing an occurrence of safety accidents in advance while preventing false information, accidental omissions and misjudgments by mistake, and furthermore enabling updating to be performed quickly when setting up explosion hazard areas and changing facilities, by systemizing and building information on explosion hazard factors.

DESCRIPTION OF REFERENCE NUMERALS

10: equipment inspection unit
20: gas inspection unit
30: dust measurement unit
40: temperature measurement unit
50: access authority unit
60: location specifying unit

BEST MODE

The advantages and features of the exemplary embodiments of the present disclosure and methods of achieving them will become apparent with reference to the exemplary embodiments described below in detail with the accompanying drawings. However, the present disclosure may be not limited to the exemplary embodiments disclosed below, but may be implemented in various different forms, and only the present exemplary embodiments may be provided to make the present disclosure complete and to give those having ordinary skill in the art to which the present disclosure belongs a complete idea of the scope of the present disclosure, which is only defined by the scope of the claims. Throughout the specification, the same reference numerals refer to the same elements.

In describing the exemplary embodiments of the present disclosure, a detailed description thereof will be omitted when it is determined that a detailed description of a known function or configuration may unnecessarily obscure the gist of the present disclosure. In addition, terms or words used in this specification and claims are terms defined in consideration of their functions in an exemplary embodiment of the present disclosure, and should not be construed as limited to ordinary or dictionary meaning, and should be construed as meaning and concept consistent with the technical idea of the present disclosure on the basis of the principle that the inventor may appropriately define the concept of the term in the best way to describe his invention.

Therefore, since the exemplary embodiments described in this specification and the configurations shown in the drawings are only the most desirable exemplary embodiments of the present disclosure and do not represent the entire technical idea of the present disclosure, it should be understood that there may be various equivalents and variations that can replace them at the time of filing the present application.

Hereinafter, before explaining with reference to the drawings, it should be noted that the matters not necessary in revealing the gist of the present disclosure, that is, known configurations that can be easily added by a person skilled in the art will not be shown or described in detail.

First, before describing various exemplary embodiments of the present disclosure in detail with reference to the accompanying drawings, the directions of the components (e.g., "before", "after", "left", "right", "up", "down", "top", "bottom", "horizontal", "longitudinal", "front", "back", "one side", "other side", "inside", and "outside") described in the following detailed description or shown in the drawings may not simply indicate or mean that it should have a specific direction, and the description of this direction may be intended to facilitate explanation of the components with reference to the attached drawings.

The present disclosure may be to prevent explosion accidents in high-risk facilities such as power generation facilities, gas, petrochemical, offshore plants, and the like that are always exposed to explosion hazards, and may relate to a safety inspection solution for an explosion-proof diagnosis that prevents an occurrence of safety accidents in advance while preventing false information, accidental omissions and misjudgments by mistake, and furthermore enabling updating to be performed quickly when setting up explosion hazard areas and changing facilities, by systemizing and building information on explosion hazard factors.

Hereinafter, a safety inspection solution for an explosion-proof diagnosis according to the present disclosure will be described in detail with reference to the accompanying drawings.

Figure 1:
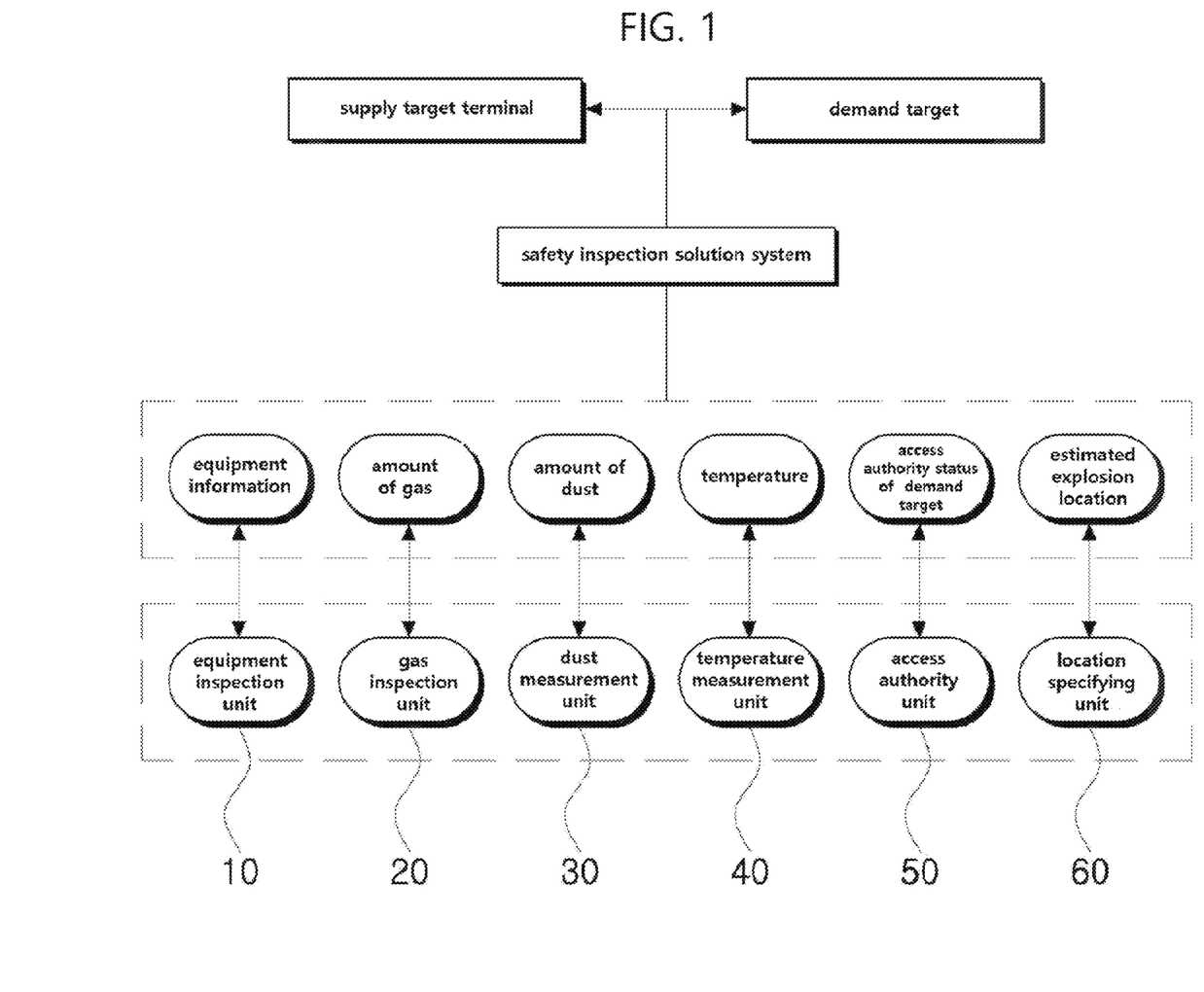
FIG. 1 is a configuration diagram showing a safety inspection solution system in a safety inspection solution for an explosion-proof diagnosis according to the present disclosure.

FIG. 1 is a configuration diagram showing a safety inspection solution system in a safety inspection solution for an explosion-proof diagnosis according to the present disclosure.

The safety inspection solution for an explosion-proof diagnosis according to the present disclosure may generate an identification code of a demand target after receiving a demand target information from a supply target terminal when the demand target information is inputted through a safety inspection solution system connected to the supply target terminal and then may enable the supply target terminal to generate and manage the demand target information by assigning the identification code of the demand target to the supply target, thereby performing a proper safety inspection for an explosion-proof diagnosis, and may generate and manage the demand target information obtained from an equipment inspection unit 10, a gas inspection unit 20, a dust measurement unit 30, a temperature measurement unit 40, an access authority unit 50, and a location specifying unit 60.

In other words, explosion proof may refer to preventing a risk of an explosion that may occur in equipment such as machinery, and the purpose of the present disclosure is to prevent explosion accidents in explosion hazard areas through thorough information management of equipment.

Furthermore, hazards may be eliminated through practical inspection activities and safe maintenance may be achieved by providing the safety inspection solution for thorough information management on equipment.

Hereinafter, in order to perform the proper safety inspections for an explosion-proof diagnosis, a technology that enables to generate and manage the demand target information will be described in detail.

First, the safety inspection solution system may receive information on a specific area and equipment installed in the specific area from the supply target terminal, and may be provided in the supply target terminal itself, provided in a separate management server, or provided in a specific area, that is, a demand target.

This safety inspection solution system may be capable of transmitting and receiving various information in order to manage specific areas and equipment, and may be configured to transmit and receive information through wireless communication.

In addition, the equipment inspection unit 10, the gas inspection unit 20, the dust measurement unit 30, the temperature measurement unit 40, the access authority unit 50, and the location specifying unit 60 for measuring the demand target information may also be provided in one or more selected from the supply target terminal, a separate management server, and a specific area.

Furthermore, the demand target information collected from the equipment inspection unit 10, the gas inspection unit 20, the dust measurement unit 30, the temperature measurement unit 40, the access authority unit 50, and the location specifying unit 60 (equipment information, gas amount, dust amount, temperature, access authority of the demand target, and the estimated explosion location) may be gathered and merged through the safety inspection solution system and may be provided to the demand target through the supply target terminal, thereby utilizing the same as data during safety inspection for an explosion-proof diagnosis or enabling measures to be taken when determined to be a hazard factor.

Figure 2:
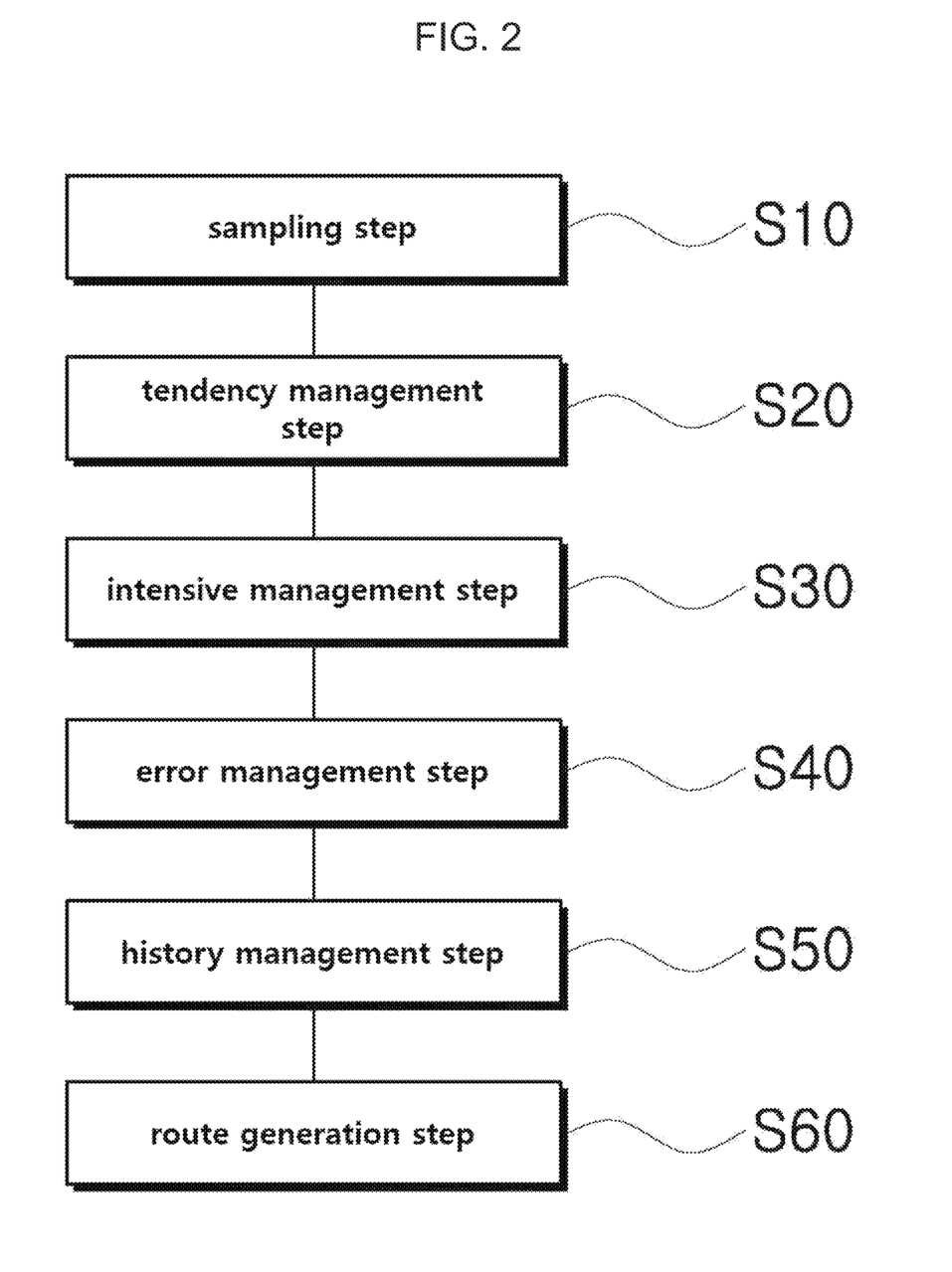
FIG. 2 is a flowchart showing a process where an equipment inspection unit is implemented in a safety inspection solution for an explosion-proof diagnosis according to the present disclosure.
Figure 3:
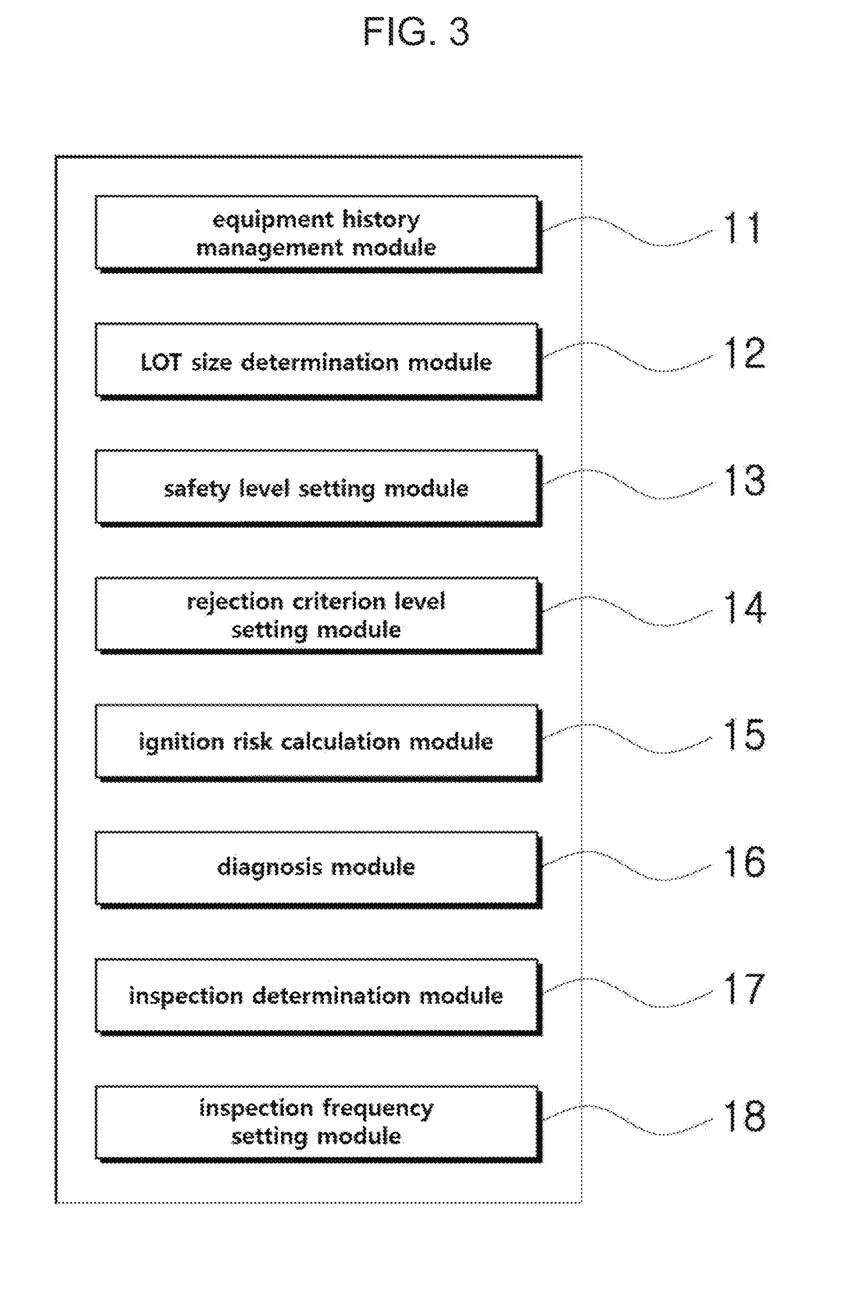
FIG. 3 is a configuration diagram showing a sampling step performance in a safety inspection solution for an explosion-proof diagnosis according to the present disclosure.
Figure 4:
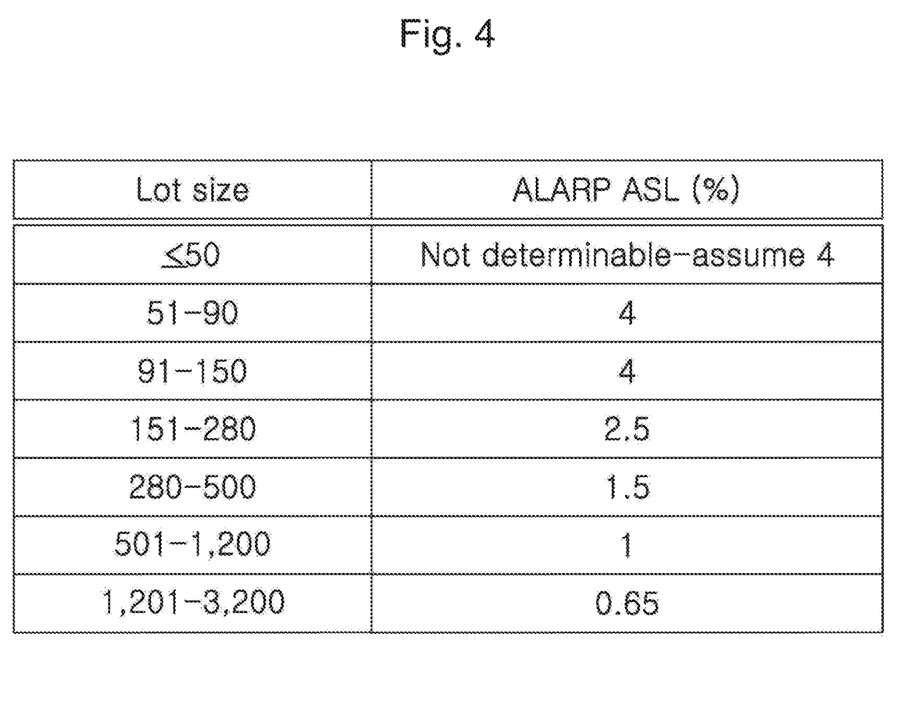
FIG. 4 is a table showing a safety level according to a LOT size in a safety inspection solution for an explosion-proof diagnosis according to the present disclosure.

FIG. 2 is a flowchart showing a process where an equipment inspection unit is implemented in a safety inspection solution for an explosion-proof diagnosis according to the present disclosure, FIG. 3 is a configuration diagram showing a sampling step performance in a safety inspection solution for an explosion-proof diagnosis according to the present disclosure, and FIG. 4 is a table showing a safety level according to a LOT size in a safety inspection solution for an explosion-proof diagnosis according to the present disclosure.

The equipment inspection unit 10 may check equipment information and manage information on the corresponding equipment.

This equipment inspection unit 10 may enable an equipment inspection through a sampling step S10, a tendency management step S20, an intensive management step S30, an error management step S40, a history management step S50, and a route generation step S60.

The sampling step S10 may enable a sample inspection of specific equipment selected among all equipment and may check an inspection cycle of specific equipment through a sample inspection rather than a full inspection.

This may have the effects of preventing the problem of time delays when performing a full inspection of all equipment and of lowering the risk of safety accidents more quickly by allowing a sample inspection of specific equipment with a higher risk potential to be performed first.

That is, the work time and costs according to the inspection may be reduced by replacing information on a full inspection of all equipment with the selected sample inspection of the specific equipment.

At this time, a determination algorithm of an inspection cycle may be used to determine only the specific equipment among all equipment and perform the sample inspection.

Herein, the determination algorithm of the inspection cycle may divide the inspection cycle into three stages according to the inspection cycle for all equipment, and may enable the sample inspection of the specific equipment belonging to one stage, where the inspection cycle remains short, to be performed.

Explaining with reference to FIG. 3, this sampling step S10 may be performed through a configuration for the sampling step performance and such a configuration may include an equipment history management module 11, a LOT size determination module 12, a safety level setting module 13, a rejection criterion level setting module 14, an ignition risk calculation module 15, a diagnosis module 16, an inspection determination module 17, and an inspection frequency setting module 18.

The equipment history management module 11 may set information of equipment and a basic inspection cycle, and the basic inspection cycle may be set on the basis of the information of a short inspection cycle by comparing the information recorded on the nameplate of specific equipment with the past inspection history information and the set safety range setting value.

The basic inspection cycle may be classified into three stages: Low, Medium, and High.

Herein, the inspection cycle of specific equipment whose level of the basic inspection cycle corresponds to the Low level may be set to be inspected once every 6 months, the inspection cycle of the specific equipment corresponding to the Medium level may be set to be inspected once every 3 months, and the inspection cycle of the specific equipment corresponding to the High level may be set to be inspected once a month.

At this time, the basic inspection cycle may be changed so that the inspection cycle of specific equipment is shortened in consideration of a location where the equipment is installed, the presence or absence of objects with a high risk of explosion in the location, aging of the equipment, information on the surrounding environment, and etc., but the maximum period set for a single inspection may not exceed two years.

The LOT size determination module 12 may perform a function of grouping the specific equipment having the same conditions across all equipment into a plurality of LOT sizes.

That is, when the total number and type of equipment are multiple, the specific equipment having the same conditions may be grouped and managed by LOT size, wherein conditions for the sample inspection may be met by performing an inspection for all equipment of the LOT size where the inspection cycle arrives or to which specific equipment determined to be a hazard factor belongs during sampling inspection, and further it is possible to prevent the problem that the inspection of equipment that should be inspected is omitted by inspecting all the specific equipment under the same conditions.

At this time, the conditions for determining the LOT size may be to analyze the commonality of specific elements that each piece of equipment has and to determine the group bound by the commonality as one LOT size in consideration of a location where each of a plurality of equipment is installed, classification according to explosion-proof structure (EX Type of protection), environmental conditions, aging of equipment, and type of equipment such as motor or lighting.

According to the design conditions, the equipment where the commonality of a plurality of equipment grouped by LOT size may exceed 60% compared to the difference may be grouped into one LOT size.

For example, when the commonality between equipment "A" and equipment "B" is analyzed on the basis of the above considerations and the ratio of commonality to difference between equipment "A" and equipment "B" is approximately 7:3, equipment "A" and equipment "B" may be grouped into one LOT size determining that the commonality exceeds 60% compared to the difference.

As another example, when the ratio of commonality to difference between equipment "C" and equipment "D" is about 5:5, the commonality to difference may be 50%, so each piece of equipment "C" and equipment "D" may be classified into different LOT size.

The safety level setting module 13 may perform a function of determining a safety level (ASL: acceptance safety level) for each piece of equipment of the LOT size grouped in the LOT size determination module 12.

At this time, explaining with reference to FIG. 3, determining the safety level (ASL) for each piece of equipment of the grouped LOT size may be to set the safety level corresponding to a numerical range of the grouped LOT size.

For example, when the LOT size is in the range of 51-90, the safety level of ALARP (as low as reasonably practicable) ASL may be set to 4.

As another example, when the LOT size is in the range equal to or less than 50, the safety level for ALARP (as low as reasonably practicable) ASL may be set to an estimated 4, in consideration of the LOT size in the 51-90 range, which is one step higher.

This safety level may represent the relative magnitude of the hazard, and explaining in reference to FIG. 3, when the LOT size is in the range of 281-500, the safety level should not exceed 1.5. When the safety level exceeds 1.5, it may mean that the magnitude of the hazard is the greatest, and the location where the corresponding equipment is installed may be classified as an unacceptable area, that is, a hazardous area.

Since this is a case where an explosion is highly likely to occur, protective measures may be performed so that the safety level is sufficiently low by notifying the user through the terminal 100, implementing step-by-step measures to prepare for an explosion, and further removing the ignition source itself through cutting off the power supply to equipment causing an explosion, in order to prevent safety accidents or minimize the degree of accident risks.

Meanwhile, the safety level of each LOT size having different zones shown in FIG. 4 may be set to an acceptable area (an unstable area).

Furthermore, the hazard level of the LOT size may be set on the basis of the safety level, and with reference to FIG. 4, a LOT size that exceeds the safety level may be classified as High, a LOT size included in the safety level that is less than or equal to the safety level and is greater than half of the safety level may be classified as Medium, and a LOT size included in the safety level that is less than or equal to half of the safety level may be classified as Low.

The rejection criterion level setting module 14 may perform a function of setting rejection criterion for equipment of each LOT size grouped in the LOT size determination module 12.

Setting a rejection criterion may be to set a rejection criterion in consideration of the level (Low, Medium, High) according to the basic inspection cycle set by the equipment history management module 11, the level (Low, Medium, High) according to the safety level set by the safety level setting module 13, the level according to environmental factors, and the level according to the aging of the equipment.

Herein, the level according to environmental factors may be classified into three levels (Low, Medium, and High) in consideration of the likelihood of explosion around the equipment, and the level according to the aging of the equipment may be set to the Low level when the number of years of use is less than 5 years, the Medium level when the number of years of use is greater than 5 years and less than or equal to 20 years, and the High level when the number of years of use exceeds 20 years.

Accordingly, the rejection criterion level setting module 14 may multiply all values corresponding to each level set for the equipment, and then divide into three equal parts to set the rejection criterion level.

In this case, in the value corresponding to each level, the Low level may have a value of 0.5, the Medium level may have a value of 1.0, and the High level may have a value of 1.5.

The ignition risk calculation module 15 may perform a function of calculating a level of an ignition risk for equipment of each LOT size grouped in the LOT size determination module 12.

The level of the ignition risk may be calculated in a way where the number of equipment determined to have a fault as a result of each equipment inspection on ignition risks is multiplied by the weight of the ignition risk and then the total is added up.

That is, the number of failed equipment may be multiplied by the weight of the ignition risk, and then the total may be added up.

Herein, the ignition risk weight may be a weight of 1.0 in case of a high ignition risk, a weight of 0.5 in case of a medium ignition risk, and a weight of 0.25 in case of a low ignition risk.

The diagnosis module 16 may perform a function of comparing and diagnosing the level of the ignition risk of the LOT size calculated in the ignition risk calculation module 15 with the rejection criterion value of the LOT size set in the rejection criterion level setting module 14.

The inspection determination module 17 may provide a notification through the output unit 20 to enable a comparison, a sample inspection and a full inspection to be performed in the diagnosis module 16.

At this time, when the level of ignition risk is greater than the rejection criterion value as a result of comparison in the diagnosis module 16 and the failure factors of a plurality of equipment grouped in one LOT size fall into the same category, the sample inspection may be performed for the remaining equipment excluding equipment having common failure factors among a plurality of equipment grouped by the LOT size.

This may reduce the time required to inspect all the plurality of equipment by determining that all the equipment having the same failures or similar failures are failed when the cause of failure of some equipment among a plurality of equipment grouped by LOT size is determined to be the same and by not performing the inspection for the corresponding equipment, and further may improve the inspection efficiency by quickly switching to the inspection for other LOT sizes.

In addition, when the level of the ignition risk is greater than the rejection criterion value as a result of comparison in the diagnosis module 16 and the failure factors of a plurality of equipment grouped in one LOT size do not fall into the same category, a full inspection may be performed since failures may occur in equipment grouped not only in the corresponding LOT size but also in other LOT sizes.

In addition, the inspection determination module 17 may perform an additional inspection of a LOT size other than the LOT size in which the equipment having failure factors is grouped, when the level of the ignition risk is less than the rejection criterion value as a result of the comparison in the diagnosis module 16.

In addition, the inspection frequency setting module 18 may perform a function of classifying equipment of the LOT size on which a sampling inspection or a full inspection is performed in the inspection determination module 17 into three stages according to the level of the ignition risk and setting an inspection cycle according to each stage.

At this time, the inspection frequency may be divided into three stages, so the low ignition risk may be set to perform the inspection once every 12 months, the medium ignition risk may be set to perform the inspection once every three months, and the high ignition risk may be set to perform the inspection once a week.

As such, the safety inspection solution for explosion-proof diagnosis according to the present disclosure may enable the sample inspection for some specific equipment among all equipment through the sampling step S10 to be performed, and replace a full inspection result with a sample inspection result, thereby reducing not only the time required for the inspection but also costs.

The tendency management step S20 may be a step of receiving a state information of specific equipment from an RFID tag in which an equipment identification code and information for identifying specific equipment are stored.

The RFID tag may be an RFID tag attached to the equipment provided in a specific location, and the RFID tag may store the equipment identification code to identify the equipment and the information about the equipment in advance.

Herein, an unique information such as the inspection cycle classified in the sampling step S10, the amount of gas flowing into the equipment, and the temperature change of the equipment may be stored in the information on the equipment.

These RFID tags may be configured to receive information about the equipment information, the amount of gas, the amount of dust, the temperature, whether to have an access authority, the estimated explosion location and the like through the supply target terminal or a separate external storage device, and update the corresponding information.

For example, when an event such as the inspection cycle of the equipment, the amount of gas flowing into the equipment, the replacement or repair of the equipment, or the changed history occurs, the accordingly changed data may be inputted and the input data may be transmitted to the RFID tag to be updated.

Accordingly, the supply target terminal may be connected to the RFID tag to transmit and receive updated data, thereby enabling a tracking inspection of specific equipment.

Herein, the tracking inspection may perform a tracking inspection on the equipment classified into "normal" and "good" in the sampling step S10 so that the tendency management is performed on the specific equipment and the tendency management may be performed for the equipment whose inspection result is Pass among the equipment that is classified as "normal" and "good" to secure stability and the equipment that is classified as "urgent".

That is, even when the inspection result of the equipment is Pass in the sampling step S10, a re-inspection for the stability may be performed through the tracking inspection, thereby significantly reducing the incidence of safety accidents.

At this time, the tracking inspection may be connected to an input/output port of the controller provided in the specific equipment so that the supply target terminal receives the status information on overvoltage, overcurrent, leakage current, insulation resistance, and ground resistance through RFID tags.

Accordingly, although the equipment that receives the inspection result of Pass in the sampling step S10 is not inspected every day, a repair or replacement may be performed when determined that a problem of the corresponding equipment occurs according to the status information by receiving the state information on the equipment through the tendency management step S20.

According to design conditions, when the value of insulation resistance and ground resistance of the equipment received by the supply target terminal exceeds a reference value, a blocking unit may be further provided in order to forcibly trip the equipment.

This blocking unit may significantly reduce the incidence of safety accidents by forcibly tripping the corresponding equipment to stop its use and by enabling a repair and replacement when the insulation resistance and ground resistance values of the equipment received by the supply target terminal exceed the reference value.

At this time, the safety inspection solution system may be integrated with any one of the magnetic switch (MS), molded case circuit breaker (MCCB), and earth leakage circuit breaker (ELCB) provided in the blocking unit, and may be implemented as a separate device according to design conditions.

The intensive management step S30 may be a step of distinguishing and inspecting a common item and a special item that are provided in a plurality of specific equipment.

Herein, the common items may be common management items that are provided in all equipment, such as the tightness force of a bolt or the loss of a bolt that is provided in the specific equipment, and the special items may be special management items that are provided in only some equipment among all equipment, such as a motor or a battery.

At this time, distinguishing and managing the special items may enable detailed management of each configuration since even the equipment is composed of various mechanical and control configurations, thereby minimizing the risk of explosion.

In addition, the intensive management step S30 may classify the equipment that does not require a power supply and therefore does not have a controller in the tendency management step S20, for example, the equipment such as gas pipes, valves, wires, and the like, which are potentially explosive but do not require a power supply, into the special items, and may perform an inspection for all equipment within a specific location where there are explosion hazards by performing the sample inspection and tendency management and the error management and space management described later.

The error management step S40 may be a step of comparing the information recorded on the nameplate of the specific equipment with the past inspection history information and a set safety range setting value, and then of updating the information with the shortest inspection cycle to perform the sampling inspection.

That is, an inspection time recorded on the nameplate of the equipment, the history information of the past inspection, and the set safety range setting value may be compared to update to the shortest inspection cycle.

Herein, the inspection time recorded on the nameplate of the equipment may mean the inspection time recorded during the manufacturing process of the equipment, the history information of the past inspection may mean a newly updated inspection cycle after the past inspection and the set safety range setting value may mean an inspection cycle established by applying domestic industrial safety laws.

The history management step S50 may be a step of receiving and updating the repair or changed information about the specific equipment.

This history management step S50 may receive and update the repair or changed information on the specific equipment, the level ("urgent", "normal", and "good") according to the inspection cycle may be classified in the sampling step S10, and the inspection cycle for the equipment may be set by reflecting the past inspection history information in the error management step S40.

At this time, it may be preferable that the data in the history management step S50 is updated in real time, and accordingly, it may be possible to prevent in advance the problem of the misjudgment, the false information or the omission of inputting information by mistake.

For example, when a bolt provided in specific equipment is replaced after performing a sample inspection, the inspection cycle for this may be changed and classified from "urgent" to "good" and the sample inspection target, that is, the inspection cycle, may be allowed not to be classified as "urgent" at the next inspection cycle by newly updating the inspection cycle.

According to design conditions, the history management step S50 may be configured to perform an appropriateness assessment for the repair or changed information using a deep learning algorithm when the repair or changed information on the specific equipment is detected.

Herein, the appropriateness assessment may detect the repair or change on the specific equipment and may feed the appropriateness assessment information about these behavior patterns to train the artificial intelligence.

Furthermore, the artificial intelligence training may perform the training using deep learning algorithms, and feedback data may be accumulated according to the trained results, thereby performing the appropriateness assessment of work according to the repair or change to the specific equipment.

Processing information using such a deep learning method may enable an inspection cycle to be shorter than the inspection cycle set in the past when the repairs to the same equipment are performed by training and turning into data the case of a history where workers performed the repairs on the specific equipment in the past and the inspection cycle was newly updated, but there was a history where an explosion occurred.

For example, when a history of an explosion accident was also detected even when workers performed the repairs on the specific equipment in the past and the inspection cycle was classified as "good" so that the inspection was performed twice a month, the inspection cycle for the corresponding equipment may be classified as "normal" and the inspection may be performed once a week even when the repairs are performed.

Such a history management step S50 may have the advantage of significantly reducing the likelihood of an explosion by detecting the repair or changed information of the specific equipment through the appropriateness assessment and accordingly by reflecting the inspection cycle according to the trained result.

Figure 5:
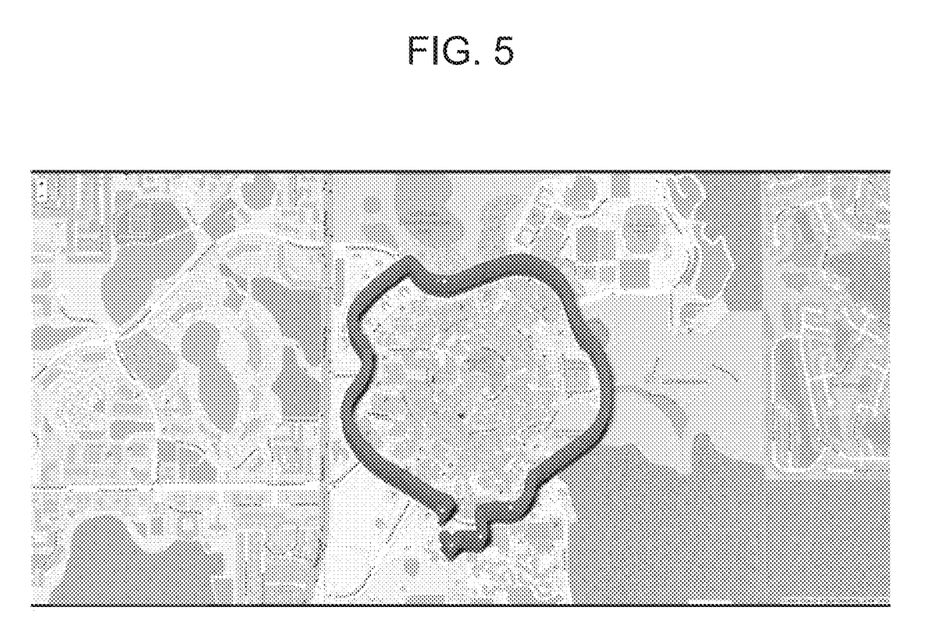
FIG. 5 is a view showing an example of mapping and displaying an inspection route in a safety inspection solution for an explosion-proof diagnosis according to the present disclosure.

FIG. 5 is a view showing an example of mapping and displaying an inspection route in a safety inspection solution for an explosion diagnosis according to the present disclosure.

At this time, the route generation step S60 may be configured to complete a 3D map from a video image photographed through a wearable camera when generating an optimal route.

Such a 3D map may be utilized to generate the shortest route and optimal route for the inspection of explosion-proof equipment in the plant and furthermore, provide an optimized inspection route by providing information such as whether the inspection was performed in the past or the time elapsed after the inspection was performed in the past.

For example, as shown in FIG. 5, the inspection route setting module 60 may be configured to map and display the inspection route through the terminal 100 by utilizing a video image photographed through a wearable camera.

Herein, the route shown on the map of FIG. 5 may be generated such that a plurality of points, including a starting point and an ending point, are marked on the map so that the inspection can be performed sequentially along the route, and the point at the location where the user visited, that is, the location visited by the user so that the inspection is performed, may be deleted from the map.

That is, when the inspection is not performed according to the set route after a route generation is completed in the route generation step S60, it may be determined as a non-performing route and may be notified to the user through the terminal.

Accordingly, it may be possible to prevent the problem of missing the inspection of the equipment and increase the efficiency of the equipment inspection by traveling along the optimal route according to the equipment inspection when inducing the user holding the terminal to move along the optimal route.

According to design conditions, whether a safety accident such as a heavy object falling, a crane malfunction, or a fire occurs in the surrounding area may be determined while performing an inspection of explosion-proof equipment through a wearable camera, and a danger signal may be generated through the terminal.

This may ensure the user's safety by detecting and notifying of whether safety accidents occur in the surrounding area through a wearable camera in the process of the user performing the inspection along the optimal route generated in the route generation step S60.

Accordingly, the user may perform the inspection along the optimal inspection route generated by the route generation step S60 but when a danger signal is generated, the optimal inspection route may be modified or safety measures may be performed in order to prevent the occurrence of a user's safety accident.

The gas inspection unit 20 may measure the amount of gas in a specific location where there is a risk of an explosion where equipment is provided.

That is, the amount variation of gas in a specific location may be measured and an alert may be triggered when the measured amount of gas exceeds a reference value.

In this case, the reference value may be classified into steps, and an alert may be triggered at each step in a process where the amount of gas continuously increases.

In addition, the gas inspection unit 20 may be configured to measure the amount of gas supplied to the equipment and the amount of gas discharged.

This may enable to determine the likelihood of an explosion and prevent the occurrence of a safety accident by measuring not only the amount of gas in a specific location but also the change in the amount of gas supplied to each piece of equipment.

The dust measurement unit 30 may measure the amount of dust in a specific location.

Such a dust measurement unit 30 may prevent the process of the combustion and explosion of dense dust being energized, and generating heat and pressure while floating in the air.

That is, the amount of dust in a specific location may be measured and an alert may be triggered when the measured amount of dust exceeds a reference value.

At this time, a dust sensor to measure the amount of dust may be configured to partition a specific space of the demand target where there is a risk of an explosion where the equipment is installed and to notify the supply target terminal of when the amount of dust measured from a dust sensor installed at the entrance of the specific partitioned space is more than a preset value.

According to design conditions, the dust sensor for dust measurement may be configured to partition a specific space of the demand target where the equipment is installed and where there is a risk of an explosion and to notify the supply target terminal of when the difference between the amount of dust measured by the dust sensor installed at the entrance of the specific partitioned space and the amount of dust measured by the dust sensor installed in a discharge pipe is greater than or equal to a preset value.

This dust measurement unit 30 may be utilized as data to significantly reduce the likelihood of dust explosions, and a separate dust collector may be provided for a specific location where the amount of dust increases.

The temperature measurement unit 40 may perform a function of measuring temperature changes in a specific location and temperature changes in specific equipment in real time and notifying the supply target terminal of the same.

In this case, the means for measuring the temperature may be a thermal image detection device such as a sensor or a camera.

These temperature changes may be used to find the starting point of increased heat and pressure, which are precursors of an explosion, in a specific location where there is a risk of an explosion, and the likelihood of an explosion risk may be significantly reduced by enabling management according to temperature changes.

The access authority unit 50 may check the access authority of the inspected demand target and may perform a function of controlling the access of non-experts within a specific location where there is a risk of an explosion.

That is, the access authority unit 50 may allow only authorized experts or managers to enter a specific location where there is a risk of an explosion, and significantly reduce the risk of an explosion accident by mistake of a non-expert.

At this time, distinguishing authorized experts or managers may enable a access to be limited to those who have obtained a license in advance.

Furthermore, when an explosion accident has already occurred, the access authority may be changed from a specific expert to all personnel.

The location specifying unit 60 may be for specifying the estimated explosion location, and may set the explosion radius according to the explosion hazard factor.

In this case, the supply target terminal may display a map in consideration of the number of equipment and the arrangement of equipment in a specific location, and marking may be performed on the map differently according to the likelihood of an explosion.

For example, a specific location where a lot of equipment is arranged may be marked in red because the risk of an explosion is high and the range when an explosion occurs is wide and a specific location where less equipment is arranged may be marked in green or yellow because the risk of an explosion is relatively low.

At this time, setting the explosion radius according to explosion-proof hazard factors may provide managers with information on the likelihood of chain explosions, such as a floor plan map of a specific location, the arrangement of equipment, and the number of installed equipment, in the event of an explosion accident, thereby preventing a secondary accident and minimizing the expansion of explosion accidents.

As such, the safety inspection solution for the explosion-proof diagnosis according to the present disclosure may be to significantly lower the risk of an explosion by performing the explosion-proof diagnosis and enabling the safety inspection.

At this time, the supply target terminal may collect and merge information on the received equipment information, the amount of gas, the amount of dust, the temperature, the access authority status of the demand target, and the estimated explosion location and then cut off the power of the equipment through the safety inspection solution system when an explosion hazard factor is detected.

For example, an explosion may be prevented by cutting off the power supply or gas supply of the corresponding equipment and then by allowing the inspection, repair, or replacement when the insulation resistance and ground resistance values received by the supply target terminal through the RFID tag in the tendency management step S20 exceed the reference value though an inspection result of Pass is received after a sampling inspection of specific equipment.

According to this configuration, the safety inspection solution for explosion-proof diagnosis according to the present disclosure is to prevent explosion accidents in high-risk facilities such as power generation facilities, gas, petrochemical, offshore plants, and the like that are always exposed to explosion hazards, and relates to a safety inspection solution for an explosion-proof diagnosis that prevents an occurrence of safety accidents in advance while preventing false information, accidental omissions and misjudgments by mistake, and furthermore enabling updating to be performed quickly when setting up explosion hazard areas and changing facilities, by systemizing and building information on explosion hazard factors.

Although various exemplary embodiments of the present disclosure have been suggested and described, the present disclosure may be not necessarily limited thereto, and it may be understood by those skilled in the art that various substitutions, modifications, and changes may be made without departing from the technical idea of the present disclosure.

The invention claimed is:

1. A safety inspection solution method for an explosion-proof diagnosis that generates an identification code of a demand target after receiving a demand target information from a supply target terminal when the demand target information is inputted through a safety inspection solution system connected to the supply target terminal and enables the supply target terminal to generate and manage the demand target information by assigning the identification code of the demand target to the supply target,
  wherein the demand target information comprises
    equipment information received from an equipment inspection unit,
    an amount of gas measured from a gas inspection unit,
    an amount of dust measured from a dust measurement unit,
    a temperature measured from a temperature measurement unit,
    an access authority status of the demand target inspected from an access authority unit, and
    an estimated explosion location measured from a location specifying unit, and
  wherein the supply target terminal collects the received equipment information, the amount of gas, the amount of dust, the temperature, the access authority status of the demand target, and the estimated explosion location, and
    then provides the collected equipment information, amount of gas, amount of dust, temperature, access authority status of the demand target, and estimated explosion location to the demand target through the safety inspection solution system.

2. The safety inspection solution method of claim 1, wherein an equipment inspection performed by the equipment inspection unit comprises:
  a sampling step that enables a sample inspection of specific equipment selected from all equipment,
  a tendency management step that receives a status information of the specific equipment from an RFID tag that stores an equipment identification code for identifying the specific equipment and information,
  an intensive management step that distinguishes and inspects a common item and a special item provided in a plurality of the specific equipment,
  an error management step that compares information recorded on a nameplate of the specific equipment with a past inspection history information and a set safety range setting value,
  a history management step that receives information about a repair or change for the specific equipment, and
  a route generation step that generates an optimal route for an inspection from a video image photographed through a wearable camera.

3. The safety inspection solution method of claim 2, wherein the sampling step comprises
  an equipment history management that sets the equipment information and a basic inspection cycle,
  a lot size determination that groups the specific equipment having same conditions among all equipment into a plurality of lot sizes,
  a safety level setting that determines an acceptance safety level (ASL) for each piece of equipment of the lot size grouped in the lot size determination,
  a rejection criterion level setting that sets a rejection criterion for each piece of equipment of the lot size grouped in the lot size determination,
  an ignition risk calculation that calculates a level of an ignition risk for each piece of equipment of the lot size grouped in the lot size determination, and
  a diagnosis that compares and diagnoses the level of the ignition risk of the lot size calculated in the ignition risk calculation with a rejection criterion value of the lot size set in the rejection criterion level setting,
  wherein the sample inspection is performed for remaining equipment excluding equipment having common failure factors among a plurality of equipment grouped by the lot size when determined to be a common factor failure of the equipment in case the level of the ignition risk is greater than the rejection criterion value as a result of comparison in the diagnosis and
  conversely a full inspection is performed for all of one or more lot sizes when determined to be not a common factor failure.

4. The safety inspection solution method of claim 2, wherein the tendency management step allows the supply target terminal to receive a status information on overvoltage, overcurrent, leakage current, insulation resistance, and ground resistance while connected to an input/output port of a controller provided in the specific equipment.

5. The safety inspection solution method of claim 2, wherein in the intensive management step, the common item is a common management item that is provided in all equipment, including a tightness force of a bolt or a loss of a bolt, and
  the special item is a special management item that is provided in only some equipment, including a motor or a battery, among all equipment.

6. The safety inspection solution method of claim 2, wherein the error management step compares information recorded on the nameplate of the specific equipment with the past inspection history information and the set safety range setting value, and then updates information with a short inspection cycle to enable a sampling inspection.

7. The safety inspection solution method of claim 2, wherein the history management step enables an appropriateness assessment for the repair or changed information using a deep learning algorithm when the repair or changed information on the specific equipment is detected.

8. The safety inspection solution method of claim 2, wherein the route generation step distinguishes and determines a route where an inspection is completed and a route where an inspection is not performed through the video image photographed by the wearable camera, and notifies the information about the route where the inspection is not performed.

9. The safety inspection solution method of claim 8, wherein the route generation step notifies of a danger signal when an accident including a heavy object fall, a crane malfunction, or a fire occurs through the wearable camera.

10. The safety inspection solution method of claim 1, wherein the dust measurement unit partitions a specific space of the demand target where there is a risk of an explosion where the equipment is installed and notifies the supply target terminal when the amount of dust measured from a dust sensor installed at an entrance of the specific partitioned space is more than a preset value.

11. The safety inspection solution method of claim 1, wherein the dust measurement unit partitions a specific space of the demand target where there is a risk of an explosion where the equipment is installed and notifies the supply target terminal when a difference between the amount of dust measured by a dust sensor installed at an entrance of the specific partitioned space and the amount of dust measured by the dust sensor installed in a discharge pipe is greater than or equal to a preset value.

12. The safety inspection solution method of claim 1, wherein the supply target terminal collects and merges information on the received equipment information, the amount of gas, the amount of dust, the temperature, the access authority status of the demand target, and the estimated explosion location and then cuts off the power of the equipment through the safety inspection solution system when an explosion hazard factor is detected.

* * * * *